(12) United States Patent
Mishra et al.

(10) Patent No.: US 12,423,319 B2
(45) Date of Patent: Sep. 23, 2025

(54) SYSTEM AND METHOD FOR DATA MANIPULATION AND MANAGEMENT

(71) Applicant: Lumenore Inc., Madison Heights, MI (US)

(72) Inventors: Saurabh Mishra, Raisen (IN); Rahul Soni, Raisen (IN); Anurag Shrivastava, Raisen (IN)

(73) Assignee: Lumenore Inc.

( * ) Notice: Subject to any disclaimer, the term of this patent is extended or adjusted under 35 U.S.C. 154(b) by 0 days.

(21) Appl. No.: 18/363,740

(22) Filed: Aug. 2, 2023

(65) Prior Publication Data
US 2025/0045288 A1    Feb. 6, 2025

(51) Int. Cl.
*G06F 16/25* (2019.01)
*G06F 16/23* (2019.01)

(52) U.S. Cl.
CPC ........ *G06F 16/254* (2019.01); *G06F 16/2358* (2019.01); *G06F 16/258* (2019.01)

(58) Field of Classification Search
CPC ... G06F 16/254; G06F 16/2358; G06F 16/258
See application file for complete search history.

(56) References Cited

U.S. PATENT DOCUMENTS

| | | | | |
|---|---|---|---|---|
| 11,334,589 B2* | 5/2022 | Mehta | ................... | G06F 16/951 707/705 |
| 11,526,524 B1* | 12/2022 | Saulys | ...................... | G06F 8/34 707/705 |
| 2020/0241920 A1* | 7/2020 | Liverance | ............. | G06F 16/951 707/705 |
| 2022/0269978 A1* | 8/2022 | Edwards | ................ | G06N 20/00 707/705 |

* cited by examiner

*Primary Examiner* — Yuk Ting Choi

(57) ABSTRACT

A system for data manipulation and management, the system comprising a data integration engine, a data acquisition module, a data transformation module, a data output module and a spark engine. The data integration engine is configured to receive a job specification, wherein the job specification comprises a set of instructions. The data acquisition module is configured to acquire a set of data from a database. The data transformation module is configured to transform the set of data based on the set of instructions defined in the job specification. The data output module is configured to store a transformed set of data to the database. The spark engine is configured to receive instructions from the data acquisition module, the data transformation module, and the data output module, wherein the data acquisition module, the data transformation module, and the data output module are configured to receive instructions from the data integration engine.

7 Claims, 5 Drawing Sheets

SYSTEM AND METHOD FOR DATA MANIPULATION AND MANAGEMENT

FIELD OF THE INVENTION

This application relates generally to the field of data analytics. More particularly, the system relates to acquiring data from heterogenous sources to transform it and use the curated data for reporting or analytics.

BRIEF STATEMENT OF THE PRIOR ART

In the era of big data, organizations face the challenge of efficiently processing and integrating data from various sources. Heterogeneous data sources, including structured and unstructured data, present a significant obstacle due to their diverse formats and incompatible data models. A system and method that enables the seamless receiving, transforming, and storing of data from heterogeneous sources can be used in a wide range of applications across various industries, such as, business intelligence, data warehousing, data integration, data migration, and data cleaning.

Traditional data integration approaches often require extensive manual effort, custom scripting, and significant expertise to handle disparate data sources. Each data source typically has its own unique format, schema, and data transformation requirements, making integration a time-consuming and error-prone process. Moreover, the increasing volume, velocity, and variety of data exacerbate the complexities of data integration, necessitating more efficient solutions.

Spark is an open-source, distributed computing system known for its ability to process large-scale data sets rapidly. It provides a unified analytics engine that supports multiple data processing paradigms, such as batch processing, stream processing, and machine learning. Spark's in-memory processing capabilities and fault-tolerance make it a popular choice for big data analytics and processing workloads.

The invention disclosed in this patent specification addresses the aforementioned challenges by providing a novel system and method for receiving, transforming, and storing data from heterogeneous sources using the power of the Spark engine. The system facilitates seamless integration, efficient data transformation, and scalable storage of diverse data types. By combining the advantages of both data-driven and handcrafted approaches, our method achieves state-of-the-art performance in a cost effective manner while maintaining computational efficiency.

SUMMARY OF THE INVENTION

In an embodiment, a system for data manipulation and management is disclosed. The system comprises of a data integration engine, a data acquisition module, a data transformation module, a data output module and a spark engine. The data integration engine is configured to receive a job specification, wherein the job specification comprises a set of instructions. The data acquisition module is configured to acquire a set of data from a database. The data transformation module is configured to transform the set of data based on the set of instructions defined in the job specification. The data output module is configured to store a transformed set of data to the database. The spark engine is configured to receive instructions from the data acquisition module, the data transformation module, and the data output module, wherein the data acquisition module, the data transformation module, and the data output module are configured to receive instructions from the data integration engine.

BRIEF DESCRIPTION OF DRAWINGS

Embodiments are illustrated by way of example and not limitation in the figures of the accompanying drawings, in which like references indicate similar elements and in which.

DETAILED DESCRIPTION

The following detailed description includes references to the accompanying drawings, which form a part of the detailed description. The drawings show illustrations in accordance with example embodiments. These example embodiments, which may be herein also referred to as "examples" are described in enough detail to enable those skilled in the art to practice the present subject matter. However, it may be apparent to one with ordinary skill in the art, that the present invention may be practised without these specific details. In other instances, well-known methods, procedures and components have not been described in detail so as not to unnecessarily obscure aspects of the embodiments. The embodiments can be combined, other embodiments can be utilized, or structural, logical, and design changes can be made without departing from the scope of the claims. The following detailed description is, therefore, not to be taken in a limiting sense, and the scope is defined by the appended claims and their equivalents.

In this document, the terms "a" or "an" are used, as is common in patent documents, to include one or more than one. In this document, the term "or" is used to refer to a nonexclusive "or," such that "A or B" includes "A but not B," "B but not A," and "A and B," unless otherwise indicated.

Figure 1:
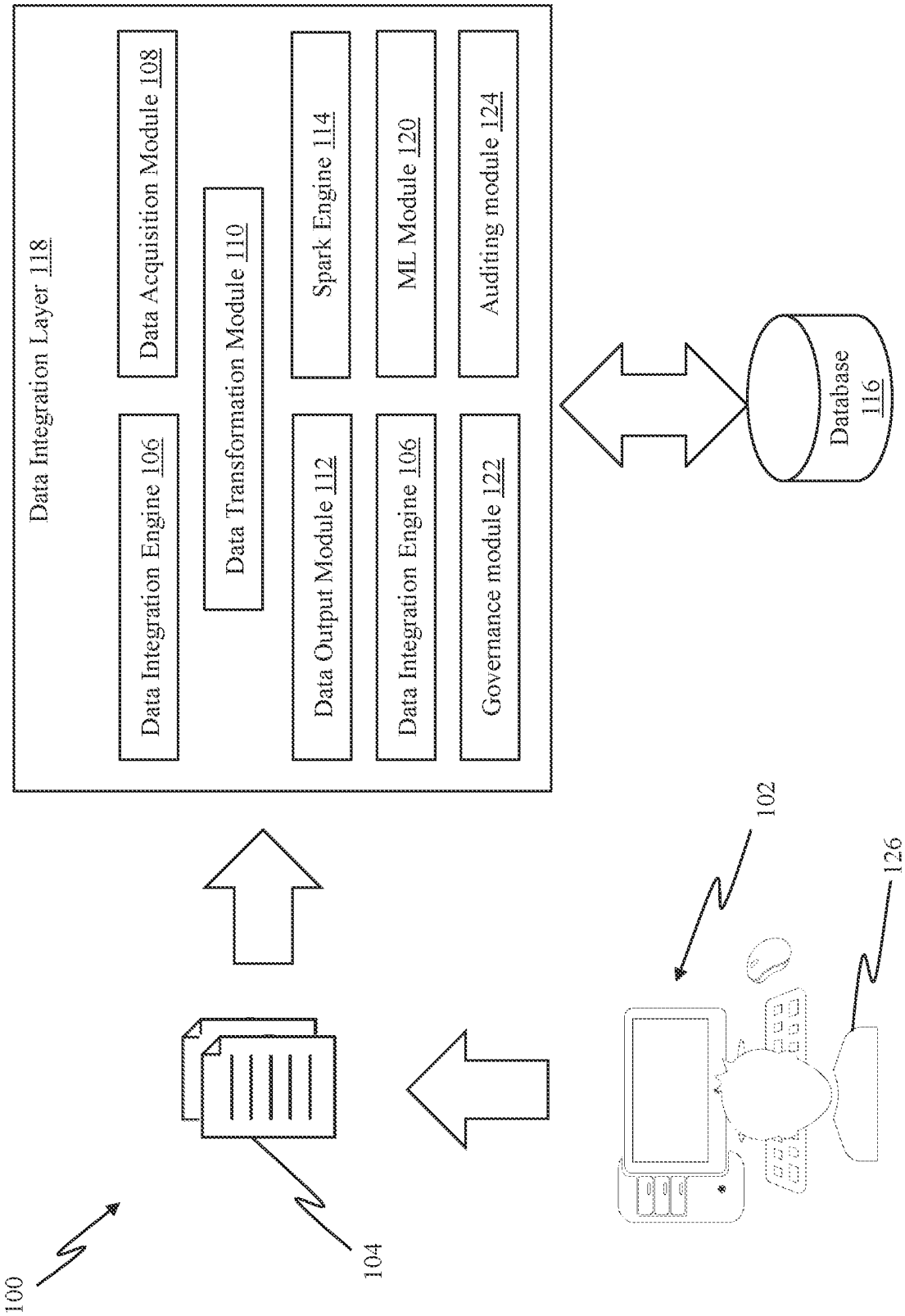
FIG. 1 illustrates a system 100 for data manipulation and management, in accordance with an embodiment.

FIG. 1 illustrates a system 100 for data manipulation and management, in accordance with an embodiment. The system 100 may comprise of a data processing system 102, a database 116, a data integration layer 118, one or more processors, and a user 126 associated with the data processing system 102.

In an embodiment, the data processing system 102 may be configured to receive a set of instructions from the user 126. The data processing system 102 may be configured to generate a job specification 104 comprising the set of instructions received from the user 126.

In an embodiment, the system 100 may be configured to execute the job specification 104 in the order the set of instructions are defined.

Figure 2:
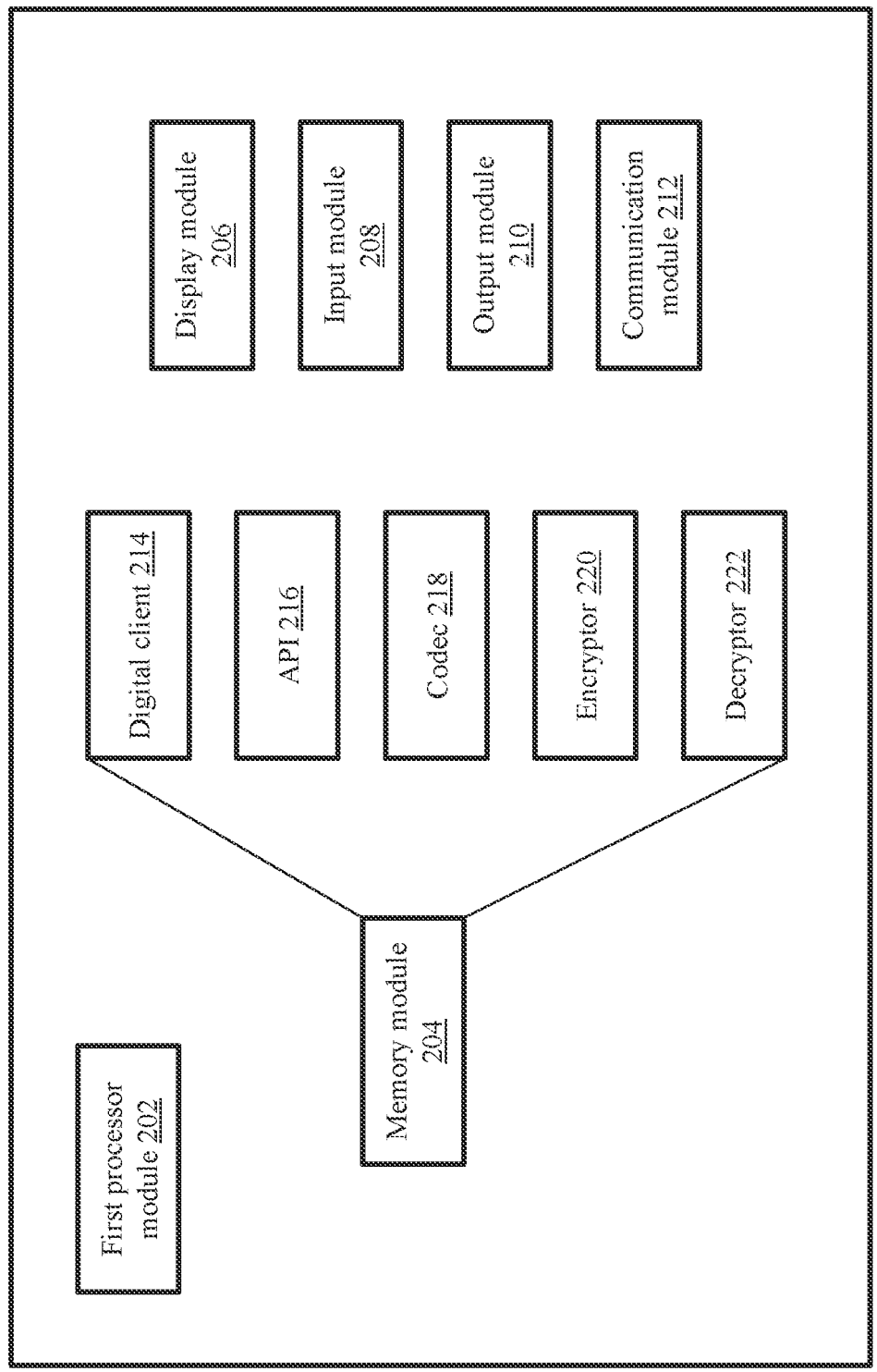
FIG. 2 is a block diagram illustrating a data processing system 102, in accordance with an embodiment.

FIG. 2 is a block diagram illustrating the data processing system 102, in accordance with an embodiment. The data processing system 102 may comprise a first processor module 202, a memory module 204, a display module 206, input modules 208, output modules 210 and a communication module 212.

The first processor module 202 may be implemented in the form of one or more processors and may be implemented as appropriate in hardware, computer-executable instructions, firmware, or combinations thereof. Computer-executable instruction or firmware implementations of the first processor module 202 may include computer-executable or machine-executable instructions written in any suitable programming language to perform the various functions described.

The memory module 204 may include a permanent memory such as hard disk drive, may be configured to store data, and executable program instructions that are implemented by the processor module. The memory module 204 may be implemented in the form of a primary and a secondary memory. The memory module 204 may store additional data and program instructions that are loadable and executable on the first processor module 202, as well as data generated during the execution of these programs. Further, the memory module 204 may be volatile memory, such as random-access memory and/or a disk drive, or non-volatile memory. The memory module 204 may comprise of removable memory such as a Compact Flash card, Memory Stick, Smart Media, Multimedia Card, Secure Digital memory, or any other memory storage that exists currently or may exist in the future.

In an embodiment, the memory module 204 may further comprise a first digital client 214, an Application Programming Interface (API) 216, a codec 218, an encryptor 220 and a decryptor 222. The first digital client 214 may be a web browser or a software application enabling multiple screen sharing simultaneously, wherein the first digital client 214 may further comprise a first digital client display interface. The codec 218 may include computer-executable or machine-executable instructions written in any suitable programming language to perform compress outgoing data and decompress incoming data. The encryptor 220 may encrypt the data being sent and decryptor 222 may decrypt the incoming data.

The display module 206 may display an image, a video, or data to a user. For example, the display module 206 may include a panel, and the panel may be an LCD, LED or an AM-OLED.

The input modules 208 may provide an interface for input devices such as keypad, touch screen, mouse and stylus among other input devices. In an embodiment, the input modules 208 includes a camera and a microphone.

The output modules 210 may provide an interface for output devices such as display screen, speakers, printer and haptic feedback devices, among other output devices.

The communication module 212 may be used by the first data processing system 102 to communicate with the server 106. The communication module 212, as an example, may be a GPRS module, or other modules that enable wireless communication.

In an embodiment, the data processing system 102 may be a computer, a laptop or any handheld device such as a phone, a tablet, and so on.

Figure 3:
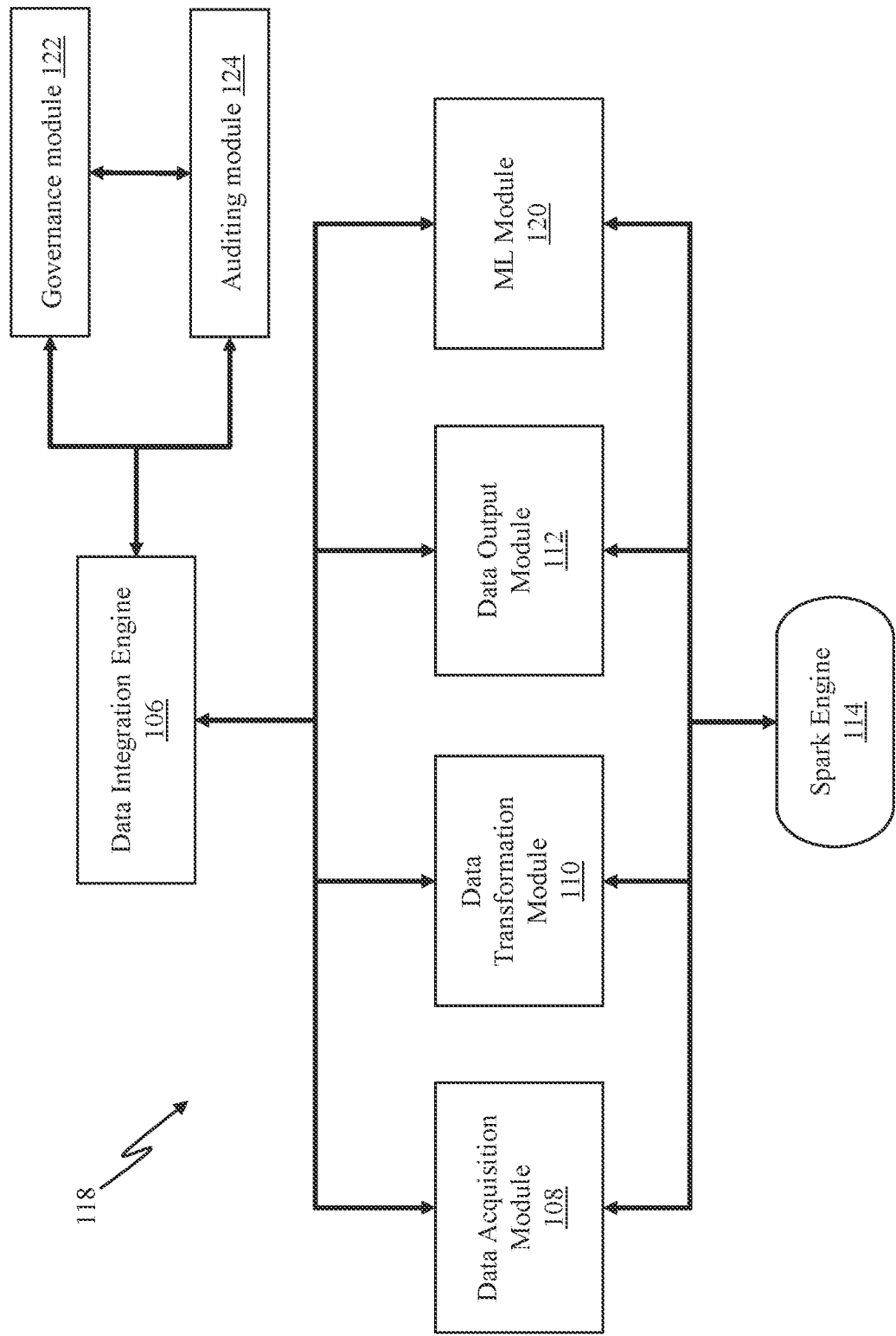
FIG. 3 illustrates a data integration layer 118, in accordance with an embodiment.

FIG. 3 illustrates the data integration layer 118, in accordance with an embodiment. The data integration layer 118 may comprise of a data integration engine 106, a data acquisition module 108, a data transformation module 110, a data output module 112, a spark engine 114, a machine learning (ML) module 120, a governance module 122, and an auditing module 124.

In an embodiment, the data integration engine 106 may take a decision to execute the job specification 104 in the order defined. The data integration engine 106 may comprise of an input data integration engine (DIE) module and an output data integration engine (DIE) module. The input DIE module may be configured to receive the job specification. The output DIE module may be configured to output data to the data processing system 102 based on the instructions in the job specification.

In an embodiment, the data integration engine 106 instructs the data acquisition module 108 to acquire a set of data based on the job specification 104. The set of data may be acquired from the database 116. The data acquisition module may be configured to instruct the spark engine 114 to acquire the set of data. The data acquisition module 108 may further be configured to communicate with the data integration engine 106 after acquiring the set of data.

In an embodiment, the data acquisition module 108 may be configured to acquire plurality of sets of data from plurality of source databases. The plurality of source databases may support different formats. The plurality of source databases may be, but not limited to, a centralized database, a distributed database, a relational database, a cloud database, an object-oriented database, a network database, and a hierarchical database.

In an embodiment, the data integration engine 106 may instruct the data transformation module 110 to transform the set of data acquired by the data acquisition module 108. Transformation of data may comprise steps of, but not limited to, filtering, transposing, adding, and aggregating. The data transformation module 110 may be configured to instruct the spark engine 114 to transform the set of data and output a transformed set of data. The data transformation module 110 may further be configured to communicate with the data integration engine 106 after transforming the set of data.

In an embodiment, the data integration engine 106 may instruct the data output module 112 to store the transformed set of data in the database 116. The data output module 112 may instruct the spark engine 114 to store the transformed set of data. The data output module 112 may further be configured to communicate with the data integration engine 106 after storing the transformed set of data based on the job specification.

In an embodiment, the data output module 112 may be configured to store plurality of sets of data in plurality of destination databases. The plurality of destination databases may support different formats. The plurality of destination databases may be, but not limited to, a centralized database, a distributed database, a relational database, a cloud database, an object-oriented database, a network database, and a hierarchical database.

In an embodiment, the output DIE module may be configured to output a selected set of data from the transformed set of data to the data processing system 102 based on the set of instructions defined in the job specification 104.

In an embodiment, the data processing system 102 may be configured to allow the user 126 to select the transformed set of data to be displayed.

In an embodiment, the governing module 122 may be configured to define a set of rules for all the modules of the system 100. Further, the governance module 122 may capture, in between other steps being performed, the behavior of data including the size of data coming from source to loading the data into preferred choice of databases. The governance module 122 may capture the user's 126 behaviour, i.e., how many times the user 126 has to perform the same task. The governance module 122 may keep governing if the user 126 has access to multiple projects.

In an embodiment, the auditing module 124 may be configured to record user 126 activity as well as keep track of each instruction received from the user 126 or initiated by the modules such as data integration engine 106, and so on.

In an embodiment, the ML module 120 may be configured to perform machine learning activities on the transformed set of data to generate a ML set of data. The job specification 104 may include details regarding the ML activities. Further, the data output module 112 may output the ML set of data to the data integration engine based on the set of instructions in the job specification 104.

Machine learning activities may involve preprocessing data, selecting or engineering features, choosing a suitable model, training and validating it, evaluating performance, tuning hyperparameters, deploying and monitoring the model, interpreting its decisions, and continuously improving it with new data. These sophisticated undertakings involve meticulous data refinement, model development, performance assessment, deployment for informed predictions, and ongoing enhancement through iterative learning. The dynamic nature of these activities empowers computers to acquire knowledge, make astute predictions, and facilitate informed decision-making, thereby augmenting the potential for transformative outcomes in diverse domains.

Figure 5:
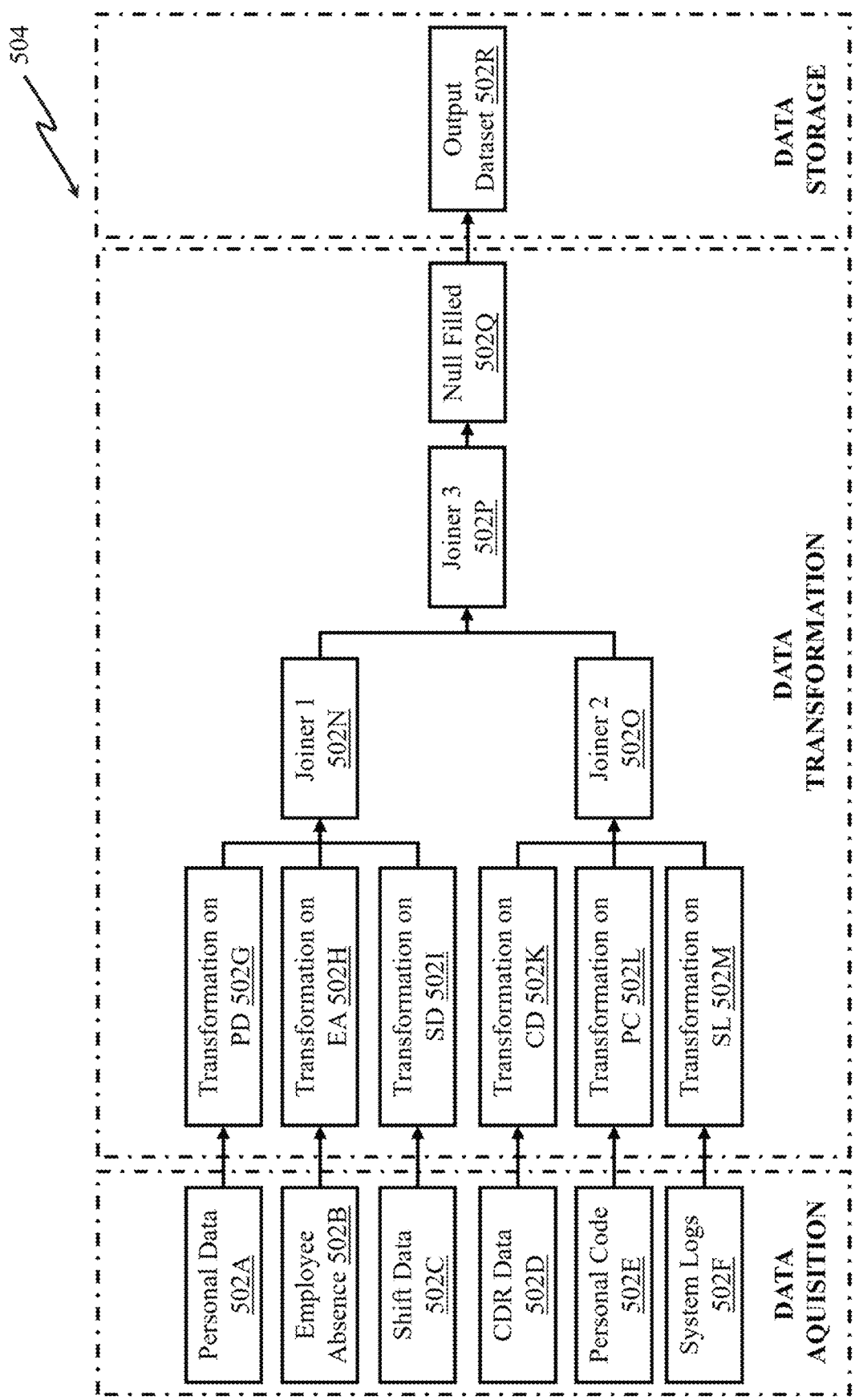
FIG. 5 illustrates blocks 502A to 502R arranged by a user, in accordance with an embodiment.

In an embodiment, referring to FIG. 5, the data processing system 102 may be configured to display a set of blocks 502A to 502R to the user 126 through the first digital client 214. Each block 502A to 502R from the set of blocks 502A to 502R represents an instruction. The user 126 may be allowed to move the set of blocks 502A to 502R on the first digital client 214. Further, the data processing system 102 may be configured to receive input via the input modules 208 from the user 126 and create the job specification 104 based on the arrangement 504 of the set of blocks 502A to 502R determined by the user 126.

Figure 4:
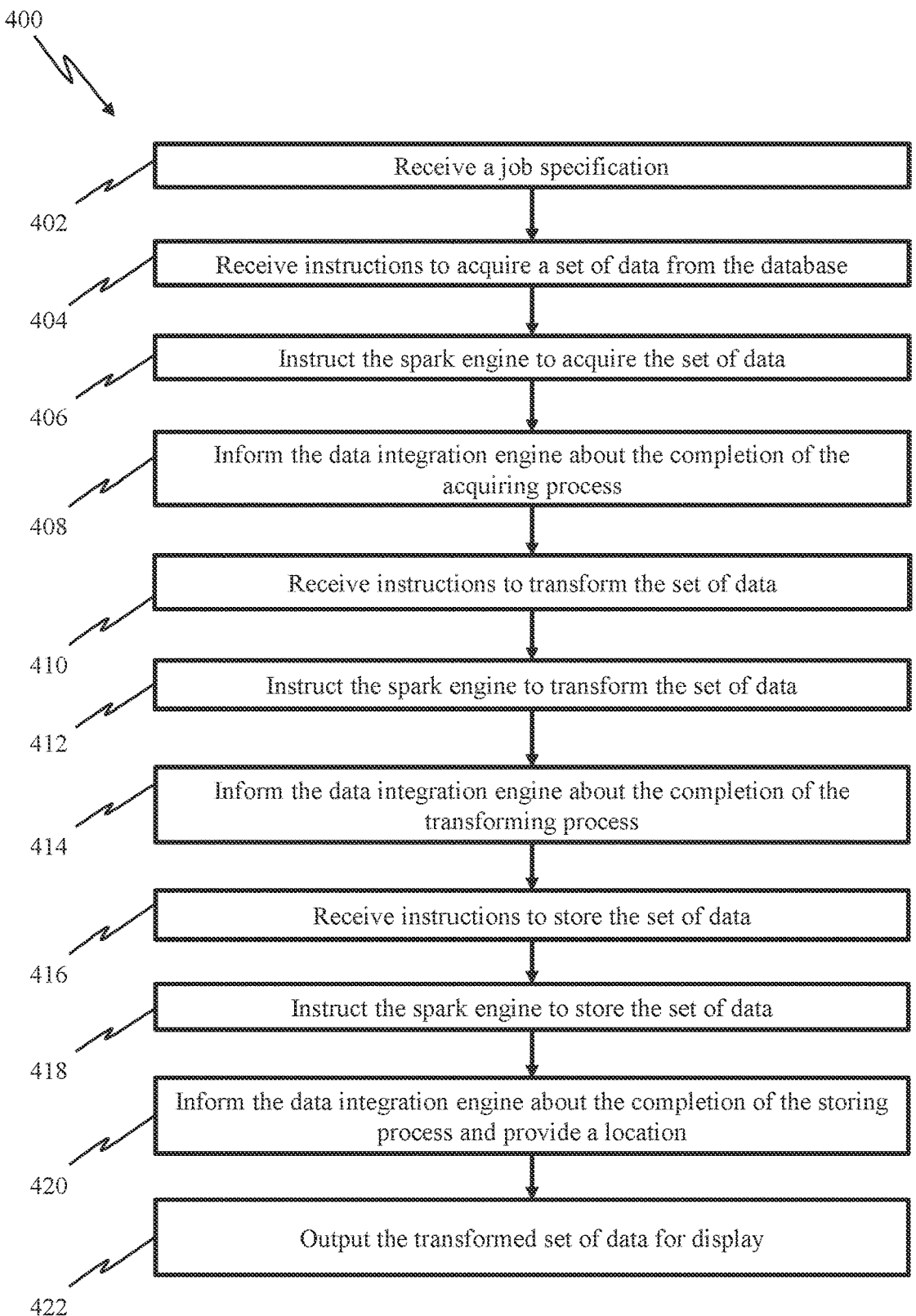
FIG. 4 illustrates a flowchart 400 depicting a method for data manipulation and management, in accordance with an embodiment.

FIG. 4 illustrates a flowchart 400 depicting a method for data manipulation and management, in accordance with an embodiment. At step 402, the input module of the data integration engine 106 is configured to receive the job specification 104.

In an embodiment, the job specification 104 may be generated by the data processing system 102 upon receiving instructions from the user 126 associated with the data processing system 102.

At step 404, the data integration engine 106 may instruct the data acquisition engine 108 to acquire or fetch a set of data from the database 116.

At step 406, the data acquisition engine 108 may instruct the spark engine 114 to acquire the set of data from the database 116.

At step 408, the data acquisition engine 108 communicates back to the data integration engine 106 upon completion of data acquisition.

At step 410, the data integration engine 106 instructs the data transformation module 110 to transform the set of data acquired by the data acquisition module 108.

At step 412, the data transformation module 110 may instruct the spark engine 114 to transform the set of data.

At step 414, the data transformation module 110 may communicate back to the data integration engine 106 upon completion of transformation of the set of data and provide a transformed set of data to the data integration engine 106.

At step 416, the data integration engine 106 may instruct the data output module 112 to store the transformed set of data in the database 116.

At step 418, the data output module 112 may instruct the spark engine 114 to store the transformed set of data in the database 116 based on the set of instructions in the job specification 104.

At step 420, the data output module 112 may communicate back to the data integration engine 106 upon completion of storing of the transformed set of data and provide a location of the transformed set of data to the data integration engine 106.

At step 422, the output module of the data integration engine 106 may be configured to output the transformed set of data to the data processing system 102 to enable viewing of data by the user 126 associated with the data processing system 102.

The disclosed system works alongside Spark engine which helps to easily catalogue the data as per user's need. Further, the Spark/Data Integration Engine serves as a central component extensively employed within the instruction set process which makes it understanding the pipelines much easier. Further, the processing becomes more time efficient and cost effective.

In an embodiment, the first digital client may use spark engine to display data on the first digital client display interface.

The processes described above is described as a sequence of steps, this was done solely for the sake of illustration. Accordingly, it is contemplated that some steps may be added, some steps may be omitted, the order of the steps may be re-arranged, or some steps may be performed simultaneously.

Although embodiments have been described with reference to specific example embodiments, it will be evident that various modifications and changes may be made to these embodiments without departing from the broader spirit and scope of the system and process or method described herein. Accordingly, the specification and drawings are to be regarded in an illustrative rather than a restrictive sense.

Many alterations and modifications of the present invention will no doubt become apparent to a person of ordinary skill in the art after having read the foregoing description. It is to be understood that the phraseology or terminology employed herein is for the purpose of description and not of limitation. It is to be understood that the description above contains many specifications, these should not be construed as limiting the scope of the invention but as merely providing illustrations of some of the personally preferred embodiments of this invention.

What is claimed is:

1. A system for data manipulation and management, the system comprising:
   a data processing system configured to:
   display a plurality of blocks to a user through a first digital client, wherein each of the blocks represents a set of software program;
   receive input from the user, via the first digital client, to move and arrange the blocks relative to one another, to define interconnection between the blocks; and
   create a job specification defining an execution sequence and dependency between the sets of software program, which is based on the interconnection between the blocks;
   a data integration engine configured to receive the job specification, wherein the data integration engine is configured to:
   provide data acquisition inputs based on the sets of software program defined by the interconnection of the blocks defined by the user;

provide data transformation inputs based on the sets of
software program defined by the interconnection of the
blocks defined by the user; and
provide data storage inputs based on the sets of software
program defined by the interconnection of the blocks
defined by the user;
a data acquisition module configured to acquire a set of
data from a plurality of heterogeneous source databases
of different kinds, supporting diverse formats, based on
the data acquisition inputs received from the data
integration engine;
a data transformation module configured to transform the
set of data based on the data transformation inputs
received from the data integration engine;
a data output module configured to store the transformed
set of data to a plurality of destination databases of
different kinds, supporting diverse formats, based on
the data storage inputs received from the data integration engine; and
a spark engine configured to receive instructions from the
data acquisition module, the data transformation module, and the data output module, wherein the data
acquisition module, the data transformation module,
and the data output module are configured to receive
instructions from the data integration engine, wherein
when the data acquisition module instructs the spark
engine, the spark engine is configured to acquire the set
of data from the source databases.

2. The system according to claim 1, wherein the data processing system is configured to display and process the transformed set of data to the user, wherein, a machine learning module is configured to perform machine learning activities on the transformed set of data, a governance module is configured to govern the system and an auditing module is configured to track each instruction.

3. The system according to claim 2, wherein the data integration engine comprises:
   an input data integration engine module configured to receive the job specification created by the data processing system; and
   an output data integration engine module configured to output the transformed set of data to the data processing system for display.

4. The system according to claim 2, wherein the auditing module is configured to track user activity.

5. The system according to claim 2, wherein the governance module is configured to define a set of rules for each module of the system.

6. The system according to claim 1, wherein when the data transformation module instructs the spark engine, the spark engine is configured to transform the set of data.

7. The system according to claim 1, wherein the spark engine is configured to store the set of data in the destination databases when the data output module instructs the spark engine.

* * * * *